United States Patent [19]

Ratz et al.

[11] Patent Number: 5,230,482
[45] Date of Patent: Jul. 27, 1993

[54] ELECTRONIC TIME THERMOSTAT WITH A TEMPORARY NEXT PERIOD ADJUSTMENT MEANS

[75] Inventors: James W. Ratz, Bloomington; Robert J. Schnell, Plymouth; Daniel T. Uhrich, Mayer, all of Minn.

[73] Assignee: Honeywell Inc., Minneapolis, Minn.

[21] Appl. No.: 811,501

[22] Filed: Dec. 20, 1991

[51] Int. Cl.⁵ ............................................. F23B 5/20
[52] U.S. Cl. .................................. 236/46 R; 165/12
[58] Field of Search ................ 236/46 R, 47; 165/12

[56] References Cited

U.S. PATENT DOCUMENTS

| | | | |
|---|---|---|---|
| Re. 32,960 | 6/1989 | Levine | 364/557 |
| 4,200,910 | 4/1980 | Hall | 236/46 R |
| 4,300,199 | 11/1981 | Yoknis et al. | 165/12 |
| 4,314,665 | 2/1982 | Levine | 236/46 R |
| 4,469,274 | 9/1984 | Levine | 165/12 X |
| 4,531,064 | 6/1985 | Levine | 307/66 |
| 4,635,708 | 1/1987 | Levine | 236/46 R |
| 4,733,719 | 3/1988 | Levine | 165/12 |
| 4,771,392 | 9/1988 | Hall | 364/557 |
| 4,898,230 | 2/1990 | Tsuchiyama et al. | 165/12 |
| 4,967,382 | 10/1990 | Hall | 364/557 |
| 4,997,029 | 3/1991 | Otsuka et al. | 236/46 R |
| 5,012,973 | 5/1991 | Dick et al. | 236/46 R |

Primary Examiner—William E. Wayner
Attorney, Agent, or Firm—Robert B. Leonard

[57] ABSTRACT

A thermostat having a temporary "now" and "next" functions. The temporary "next" function allows the user to program a temporary deviation from a preprogrammed schedule used to control the temperature within a space. The combination temporary "now" and "next" function allows a user to temporarily set a current setpoint which will be held until a temporary next setpoint becomes the control setpoint, after which the thermostat returns to the preprogrammed setpoints.

3 Claims, 4 Drawing Sheets

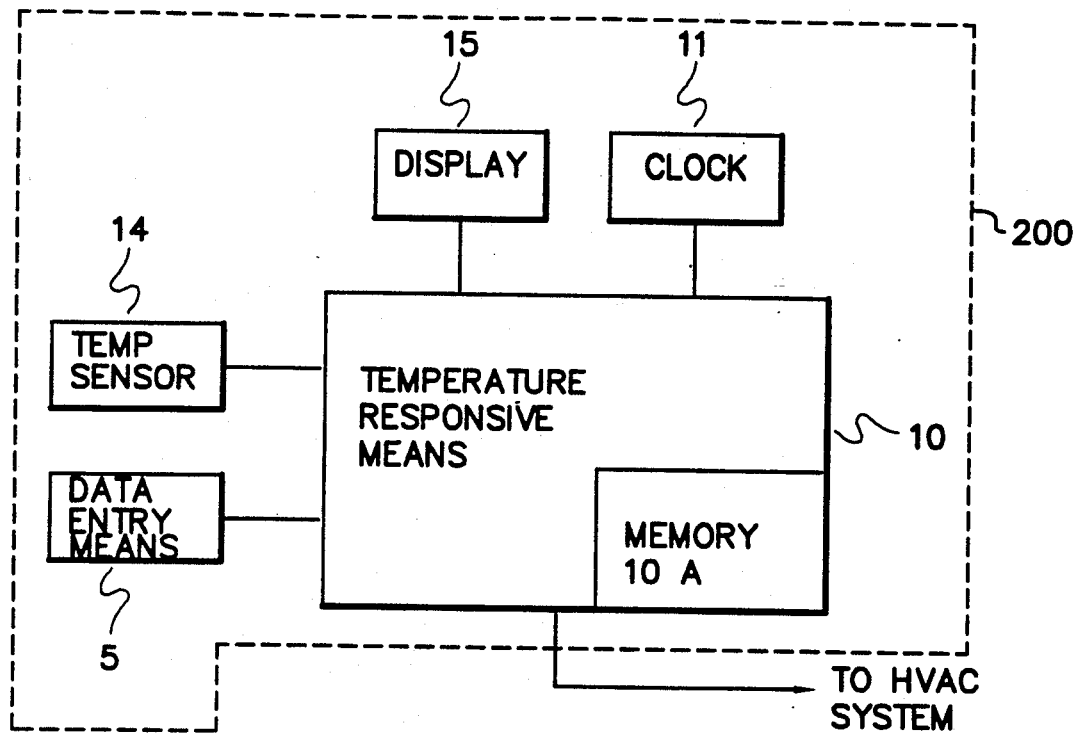
Fig.1
| START TIME | PERIOD TIME | DESIRED TEMPERATURE |
|---|---|---|
| 0800 | LEAVE | 62° |
| 1630 | RETURN | 68° |
| 2230 | SLEEP | 65° |
| 0600 | WAKE | 70° |
Fig.2
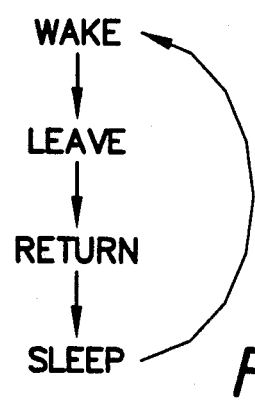
Fig.2a

| NORMAL | TEMPORARY |
|---|---|
| 0800 LEAVE | 0900 RETURN |
| 1630 RETTURN | 1400 WAKE |
| 2230 SLEEP | |
| 0600 WAKE | |

*Fig. 4a*

ELECTRONIC TIME THERMOSTAT WITH A TEMPORARY NEXT PERIOD ADJUSTMENT MEANS

BACKGROUND OF THE INVENTION

The present invention is directed to the field of thermostats and more particularly to thermostats which modify a setpoint as a function of time.

Thermostats are well known devices for control of heating ventilating and air conditioning (HVAC) systems. Thermostats which modify the temperature setpoint as a function of time period, can be found, for example in U.S. Pat. No. 4,469,274 (Levine) issued Sep. 4, 1984 and assigned to Honeywell Inc.

A problem existed with such time-temperature thermostats in that they would repeat a cycle of setpoint temperatures over and over again. There was no way to presently temporarily modify the setpoint of a period occurring one or more periods later.

SUMMARY OF THE INVENTION

The present invention is a thermostat which allows an operator to modify a future period setpoint. The thermostat repeatedly progresses through a plurality of setpoint periods in which the setpoint varies according to time. An operator may enter a temporary setpoint for use during a selected future period. When a clock in the thermostat reaches the preselected future period, the normal operation of the thermostat program is suspended and the user entered temporary setpoint is employed for control of the HVAC system. After the temporary period has expired, the thermostat returns to the normal thermostat operation program.

A further enhancement to the invention is the ability to set a temporary now temperature along with a temporary next temperature. Two time-temperature periods are entered into the thermostat, one for present control and one for future control. The normal thermostat operation program is suspended until the first normal change of periods after the temporary next period has begun.

BRIEF DESCRIPTION OF THE DRAWINGS

FIG. 1 is a block diagram of the presently inventive thermostat.

FIG. 2 is a table showing an exemplary set of temperature setpoint periods.

FIG. 2A shows an exemplary progression of the periods as run by the thermostat of FIG. 1.

FIG. 4A shows the effect of the method of FIG. 4 on the normal program operation.

DETAILED DESCRIPTION OF THE PREFERRED EMBODIMENT

Figure 3:
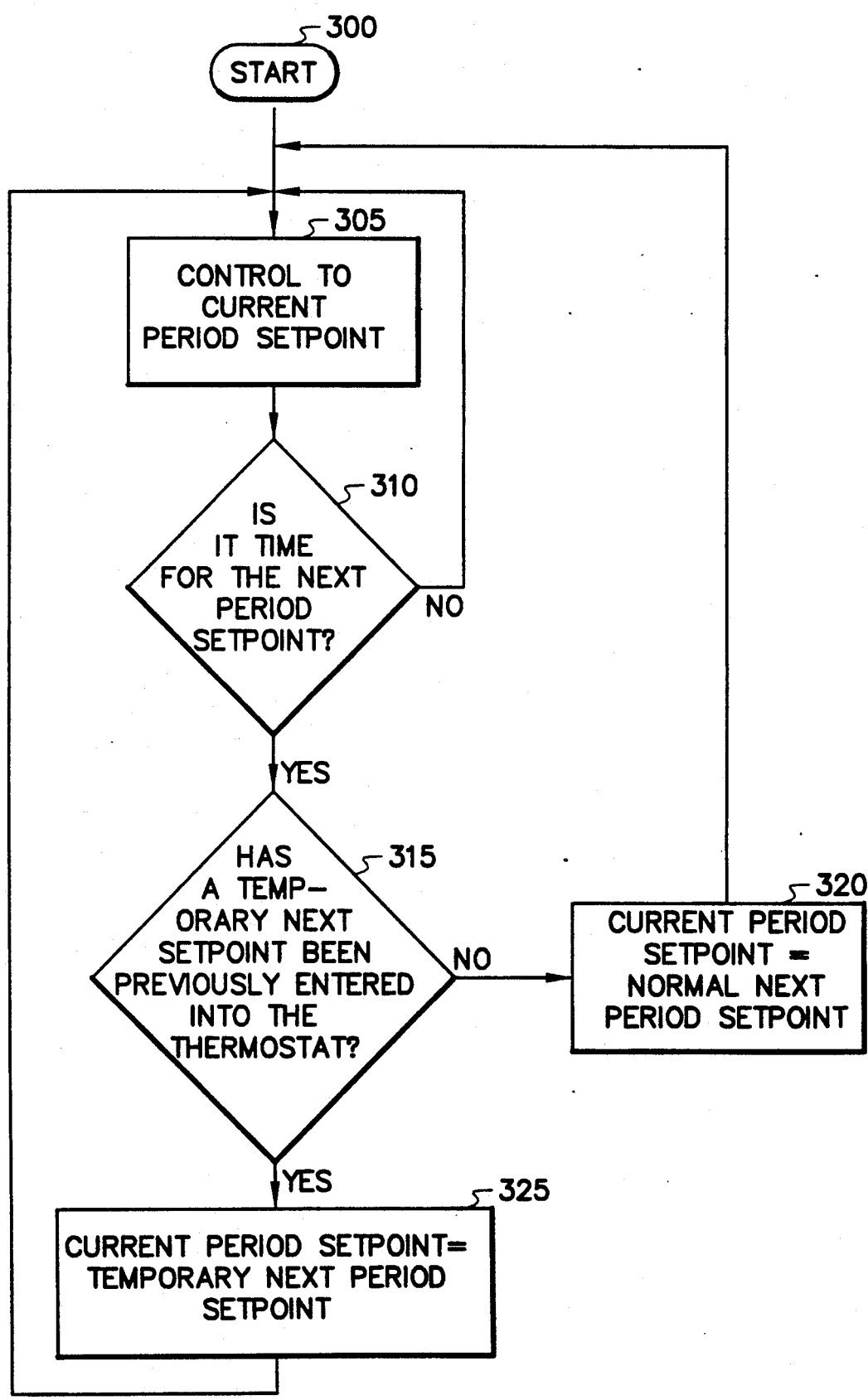
FIG. 3 is a flow chart of the method employed in the presently inventive thermostat.

FIG. 1 depicts a block diagram of the presently inventive thermostat. The thermostat 200 includes data entry means 5, temperature sensor 14, display 15, clock 11 and temperature responsive means 10.

Temperature sensor 14, which may be a thermistor, produces a temperature signal which is indicative of local temperature. Data entry means 5 is used for entering data into the thermostat. The data entry means may be a keyboard.

Display 15 is used for displaying of time and temperature data, the current temperature as indicated by the temperature signal and a current time-temperature period in which the thermostat operates. Display 15 may be a liquid crystal display.

Clock 11 produces a clock signal for timing functions in the thermostat. The clock may be a crystal oscillator.

Temperature responsive means 10 is connected to the data entry means, temperature sensor, display means and clock. It produces an output signal to control the operation of an HVAC system according to a user selected temperature setpoint. The temperature responsive means receives the temperature signal and compares the temperature signal to a prestored temperature setpoint entered by the user through the data entry means. If the temperature signal deviates from the temperature setpoint by more than a predetermined amount, the temperature responsive means activates an appropriate portion of the HVAC system in order that the HVAC system may heat or cool the selected space to make the temperature signal approach the temperature setpoint.

The above noted Levine U.S. Pat. No. 4,469,274 provides one example of time-temperature control and is incorporated herein by reference.

Temperature responsive means stores a plurality of time-temperature periods. The user through the data entry means may enter two or more time periods, each with an associated temperature setpoint. Temperature responsive means, which may be a microprocessor including memory, in coordination with the clock then controls the operation of the HVAC system according to the setpoint temperature appropriate for the given time. An example of a plurality of time temperature periods is shown in FIG. 2.

In FIG. 2, 4 periods LEAVE, RETURN, SLEEP and WAKE are each associated with a given time period and a temperature setpoint. Note that all times are based on a 24 hour clock. Temperature responsive means 10 rotates among the four setpoints associated with the four periods as clock 11 reaches the time associated with a new period. FIG. 2A shows one normal progression from the WAKE to the LEAVE to the RETURN to the SLEEP period, although the progression ma be started at any point.

FIG. 3 shows the inventive process used to allow the temporary replacement of a standard time period setpoint with a temporary time period setpoint. After starting at block 300, the process controls the space temperature to a current period setpoint as shown in block 305. Next, the process decides at block 310 if it is time for the next period to begin. If the answer is no, the process returns to block 305 to maintain the current setpoint temperature. If the answer is yes, the process moves on to decision block 315 where the process then decides if the operator has entered a temporary time period setpoint. The temporary time period setpoint, if one exists, may be stored in the memory of the temperature responsive means.

If the answer is no, then the process moves to block 320 where the current setpoint is set equal to the normal next period setpoint. Using FIG. 2A as an example, if the current period is WAKE and the answer to block 315 is no, the temperature responsive means would then control to the next normal period setpoint, which would be the LEAVE setpoint. The process then returns to block 305 for control of the HVAC system.

If the answer to block 315 is yes, the process moves on to block 325 where the current setpoint is set equal to the temporary setpoint. The process then returns to block 305 for control of the HVAC system.

Figure 4:
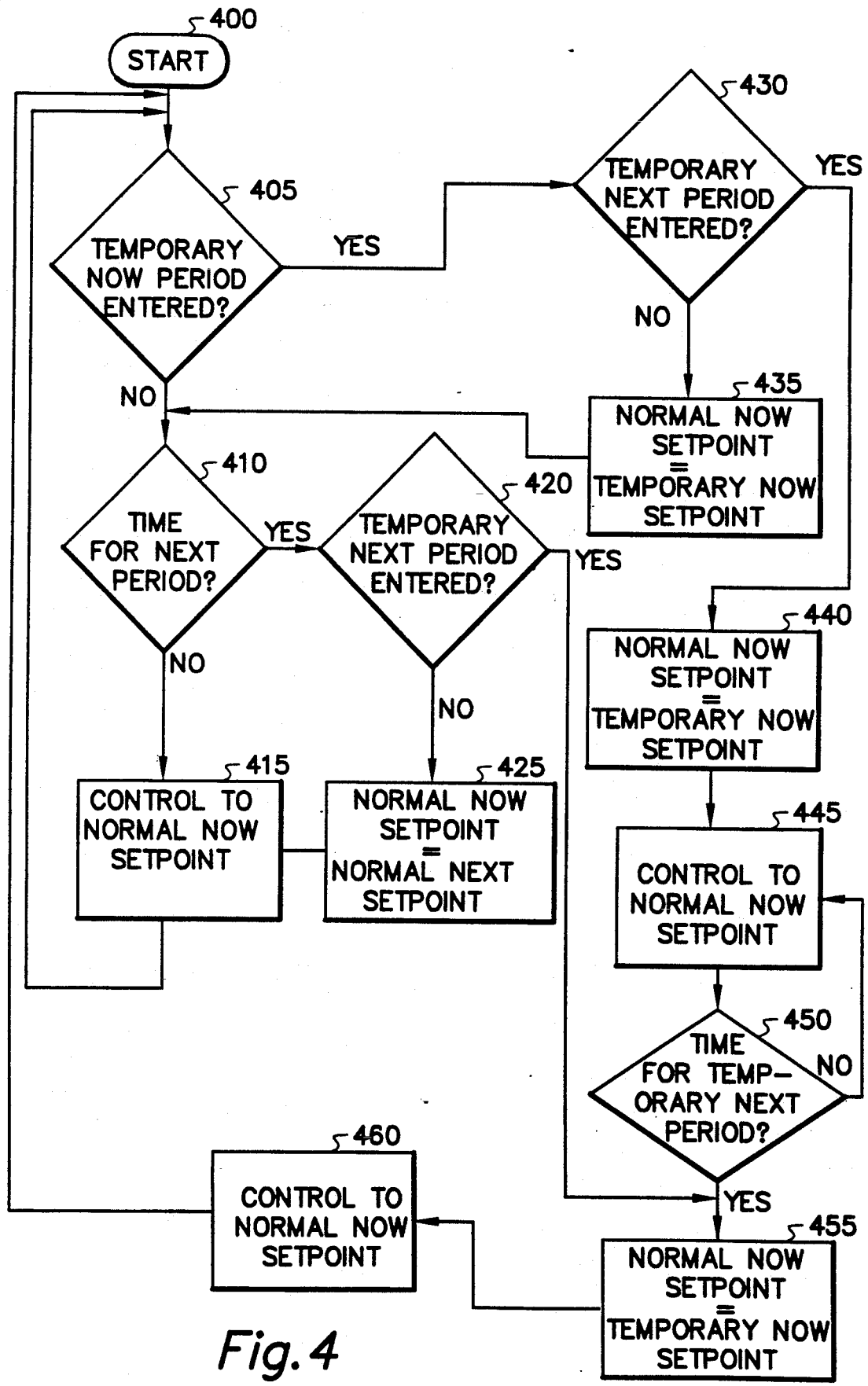
FIG. 4 is a flow chart of an enhanced version of the inventive method.

FIG. 4 discloses an enhanced version of the inventive process shown in FIG. 3. After starting at 400, the process moves to decision block 405 where the process decides if a temporary current setpoint has been entered. If the answer is no, the process moves on to block 410 where another decision is made.

At block 410, the process decides if it is time for the next time-temperature period. If the answer is no, the process controls the temperature to the current period setpoint as shown in block 415 and the process returns to block 405. If the answer is yes, then yet another decision block is reached.

At block 420, the process decides whether a temporary next setpoint has been entered into the thermostat. If the answer is no, then the current setpoint is set equal to the normal programmed next period setpoint at block 425 and the process returns to block 405. If the answer is yes, the process moves to block 455 where the current setpoint is set equal to the temporary next period setpoint. The process then controls the temperature to the current setpoint as shown by block 460 and returns to block 405 thereafter.

If the answer to block 405 is yes, the process moves to decision block 430 where the process determines if a temporary next period has also been entered. If the answer is no, then the process replaces the normal programmed current period with the temporary current period at block 435 and the process returns to block 410.

If the answer to block 430 is yes, then the process moves to block 440 where the program current temperature is replaced with the temporary current temperature. At block 445, the thermostat controls to the current temperature. At block 450, the process decides whether it is yet time for the temporary next period. If the answer is no, the thermostat continues to control to the current setpoint. If the answer is yes, the process moves to blocks 455 and 460 which as previously described then control the thermostat to the temporary next setpoint and return the process to block 400.

The effects of the process of FIG. 4 can be seen with reference to FIG. 5. The normal program periods can be seen along with their associated times in the column entitled Normal. Two temporary periods are shown under the heading Temporary.

Note that the Temporary periods may use the same name as the Normal periods, but with different times from their Normal counterparts. This would just simplify the temperature selection for the user, as the Temporary periods would be activated at the times shown under the temporary column, but would use the Normal programmed temperatures.

If the Temporary Return period were entered at 0900, along with the temporary Wake period to begin at 1400, the thermostat would immediately begin to control the temperature to 68 degrees, the Return temperature. At 1400, without any intervening temperature changes, the thermostat will go to the Wake temperature of 70 degrees.

The foregoing is a description of a novel and nonobvious method and apparatus for thermostatic control of an HVAC system. The applicants do not intend that the foregoing description limit the scope of the invention, but instead define the limits of their invention through the claims appended hereto.

We claim:

1. A method of selecting a set point period in a thermostat, the thermostat capable of having a preprogrammed sequence of set point periods, comprising the steps of:
   controlling to a current period set point;
   deciding if it is time for a next period set point;
   controlling to a temporary next period set point if said temporary next period set point has been previously entered into the thermostat by the operator;
   controlling to the normal next period set point otherwise, and
   purging said temporary next period set point after the next period has expired.

2. A thermostat for controlling the operation of an HVAC system, comprising:
   a temperature sensor for producing a temperature signal indicative of local temperature;
   data entry means for entry of data into the thermostat;
   display means for displaying information related to the thermostat and HVAC system operation;
   a clock producing a clock signal; and
   temperature responsive means connected to said data entry means, said temperature sensor, said display, and said clock, said temperature responsive means receiving said temperature and clock signals from said temperature sensor and said clock respectively, said temperature responsive means further having stored therein a plurality of time periods with associated set point temperatures, said plurality of time periods rotating on a preselected basis related to said clock signal, said temperature responsive means also having the ability to store a temporary next period set point, said temporary next period set point being used as the current set point when the clock signal indicates that the time for the temporary next period set point has occurred, said temperature responsive means purging said temporary next period set point upon expiration of the next period.

3. A method of controlling a thermostat having a plurality of prestored time-temperature periods, the plurality of time-temperature period sequencing on a predetermined basis, comprising the steps of:
   deciding if a temporary current set point has been entered;
   controlling to said temporary current set point if it has been entered, and controlling to a normal current set point otherwise;
   deciding if it is time for a next period set point and controlling to a normal next period set point if there is no temporary next period set point, and controlling to the temporary next period set point otherwise; and
   purging said temporary next period set point upon an expiration of the next period.

* * * * *